Sept. 22, 1953

B. F. WHEELER

FREQUENCY CONTROL SYSTEM FOR MICROWAVE RELAY TERMINAL STATIONS 2,653,315

Filed Feb. 20, 1951

3 Sheets-Sheet 1

INVENTOR
Benjamin F. Wheeler
BY
Charles H. Brown
ATTORNEY

Sept. 22, 1953 B. F. WHEELER 2,653,315

FREQUENCY CONTROL SYSTEM FOR MICROWAVE RELAY TERMINAL STATIONS.

Filed Feb. 20, 1951 3 Sheets-Sheet 2

INVENTOR
Benjamin F. Wheeler
BY
Charles H. Brown
ATTORNEY

INVENTOR
Benjamin F. Wheeler
BY
Charles H. Brown
ATTORNEY

Patented Sept. 22, 1953

2,653,315

UNITED STATES PATENT OFFICE 2,653,315

FREQUENCY CONTROL SYSTEM FOR MICROWAVE RELAY TERMINAL STATIONS

Benjamin F. Wheeler, Haddonfield, N. J., assignor to Radio Corporation of America, a corporation of Delaware Application February 20, 1951, Serial No. 211,942

19 Claims. (Cl. 343—179)

This invention relates to radio relay systems, and more particularly to a terminal station for a two-way microwave radio relay communication system.

In a two-way microwave relay communication system of the type to which this invention relates, there are three basic equipment units, viz., multiplexing apparatus, terminal stations and repeater stations. A repeater station especially suitable for this type of system has been disclosed in the copending Thompson application, Serial No. 205,685, filed January 12, 1951. The present invention is particularly concerned with the two-way terminal station arrangement. At the terminal station of such a system, telephone multiplex equipment (which may be of either the frequency division or time division type) is utilized to provide a multiplex signal, consisting of a plurality of signal channels, for example twenty-four in number. This multiplex signal is caused to frequency modulate a microwave transmitter, operating for example at a center frequency of 1950 megacycles, with a maximum or peak frequency deviation of plus or minus 1.5 megacycles. Service channel and fault locating equipment is provided at the terminal station for maintenance communication and fault location. Also, this terminal station is provided with equipment to receive and demodulate for use, frequency modulated intelligence having a center frequency somewhat different from that of the transmitted frequency. For example, the received center frequency may be 1990 megacycles.

In the design of practical equipment for the repeater station, as described in said application, it has been found desirable to incorporate most of the circuit elements in two major equipment units, the transmitter and the receiver/modulator. In the design of a terminal station for use with a communication system of the above type, it is desirable to utilize the same basic transmitter and receiver/modulator units in order to effect production economies, since in general any system will require a much larger number of repeater stations than terminal stations.

Terminal stations, however, must perform certain functions in addition to those performed at repeater stations. At the terminal stations, the transmitted frequency must be so controlled as to maintain it exactly on the assigned channel. At each repeater station of the system, as described in said copending application, means are provided to radiate a transmitted signal that bears an essentially fixed frequency relationship to the signal received at said repeater station.

Consequently, the receiver at each terminal station receives a frequency which is substantially controlled from the terminal station at the opposite end of the communication system. Therefore, at each terminal station the frequency transmitted must be controlled exactly to the assigned channel, since frequencies used throughout the system depend upon each initially-transmitted frequency.

As previously stated, the basic transmitter and receiver/modulator units used at the repeater stations are also desirably utilized at the terminal stations at each end of the communication system. An automatic frequency control (AFC) arrangement is provided at each repeater station to control the frequency of a local heterodyne oscillator in order to maintain the proper intermediate frequency. This same oscillator is also utilized for producing the transmitted signal at the repeater. The same type of AFC arrangement is provided and utilized at each terminal station, providing a receiver-controlled local heterodyne oscillator at each of the two terminal stations. The local heterodyne microwave oscillator at each terminal station (which is controlled in frequency, in effect, by the signal being received from the adjacent repeater station), like the local microwave heterodyne oscillator at each repeater station, is utilized both for beating or heterodyning the energy down in frequency in the receiver unit and for beating the energy up in frequency in the transmitter unit. Since this heterodyne oscillator is controlled in frequency, in effect, from the terminal station at the far end of the system, and is used for heterodyning purposes in the terminal station transmitter, under certain conditions the frequency of this oscillator may not be such as to produce the proper frequency to be transmitted from the terminal station. As previously stated, the transmitted frequency must be controlled exactly to the assigned channel, and the frequencies radiated throughout the system depend upon each initially-transmitted frequency.

Therefore, an object of this invention is to provide an arrangement, at the terminal station of a microwave radio relay system, which operates to maintain the frequency transmitted by such station substantially exactly in the assigned channel.

Another object is to provide a terminal AFC system which functions to maintain the outgoing transmitted frequency from the terminal station at substantially the correct value, even though the receiver-controlled local heterodyne oscillator, which is used for heterodyning purposes in the transmitter at the terminal station, does not have the exactly proper output frequency.

A further object is to accomplish the foregoing objects in an efficient and effective manner, utilizing as nearly as possible the identical circuits used at repeater stations, and with a minimum of additional equipment.

The foregoing and other objects of the invention will be best understood from the following description of an exemplification thereof, reference being had to the accompanying drawings, wherein.

Figure 1:
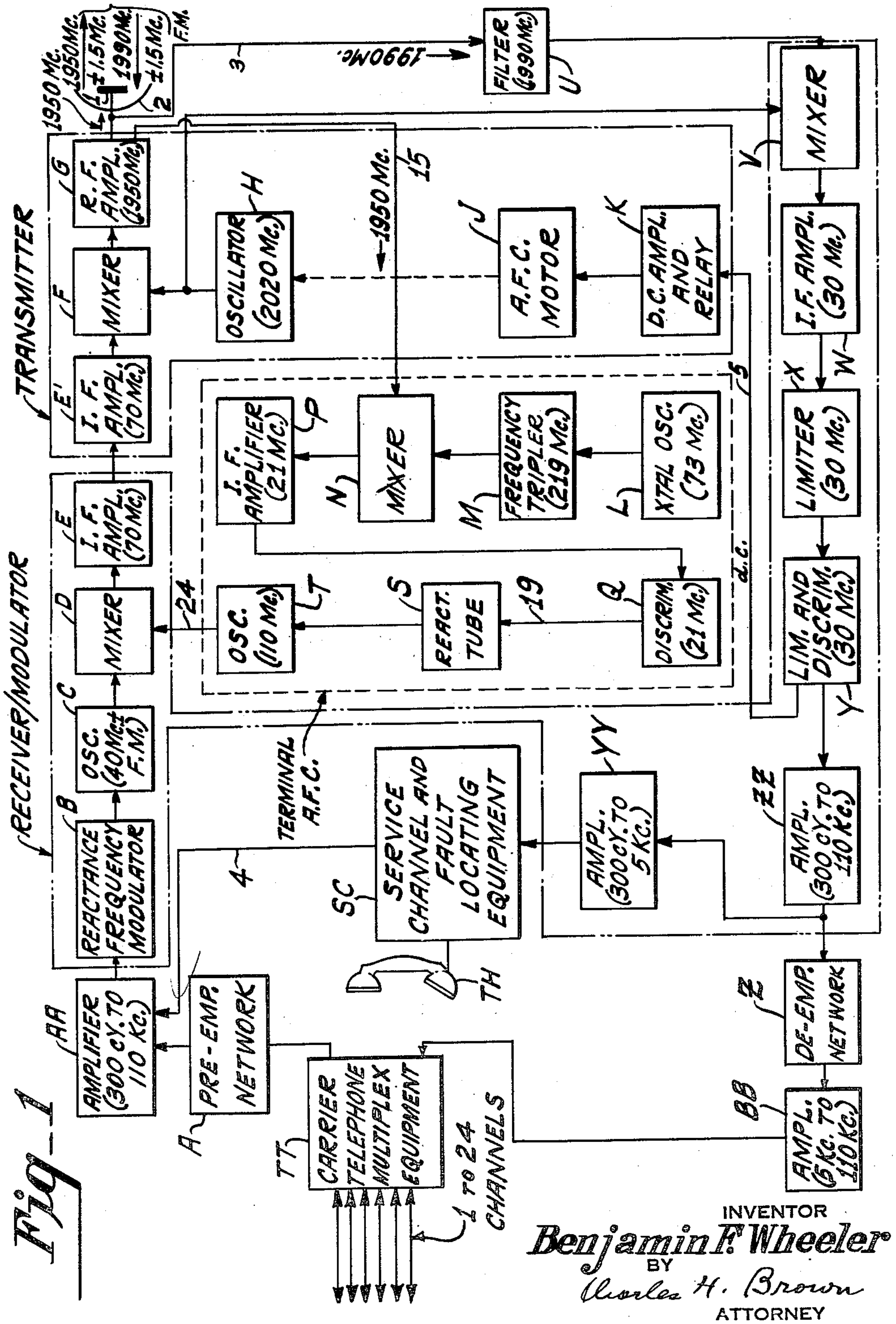
Fig. 1 is a block diagram of a terminal station according to this invention.

Referring to Fig. 1, the multiplex signal input to the terminal station illustrated is the output of carirer telephone multiplex equipment TT located at this station, which multiplex signal is first passed through the preemphasis network A, which serves to emphasize the higher frequency components, before being passed on to amplifier AA for amplification. Equipment TT is of well-known type and may be, for example, similar to that illustrated in Fig. 2 of the aforementioned copending application. A plurality of signal channels, for example one to twenty-four in number, may be utilized as the input to equipment TT. These channels may be of any desired type, such as voice, or D. C. channels for control, telemeter, or telegraph. The output of equipment TT is a multiplex signal consisting of a plurality of bands of frequencies extending overall from 300 cycles to 110 kilocycles, for example, and each band containing the intelligence of a single respective signal channel. Or, if desired, the multiplex signal may consist of a band of frequencies representing time division multiplex signals.

The multiplex signal is amplified and combined with the signals from the maintenance or service channel handset TH (passed through the service channel and fault locating equipment SC, to be later referred to) in amplifier AA. The amplified signal output of amplifier AA is applied to a frequency modulator B, which may be of the reactance type, and which operates to frequency modulate the 40-megacycle oscillator C with a maximum possible peak deviation of plus and minus 1.5 megacycles, by way of example. The output of frequency modulated oscillator C is combined with that of a 110-megacycle oscillator T (the frequency of which is stabilized or controlled in a manner to be described hereinafter) in a mixer D, the line 24 feeding energy from oscillator T to mixer D. The resulting difference frequency of 70 megacycles is amplified in two intermediate frequency (I. F.) tuned amplifiers E and E′ and applied to a second mixer F, along with a heterodyning signal from microwave oscillator H, having a frequency of 2020 megacycles, for example.

The output of mixer F contains both the sum and the difference of the two applied frequencies, and either one or the other of these may be utilized for transmission. In the example illustrated, the difference frequency of 1950 megacycles is used, this frequency being amplified in the tuned radio frequency amplifier G and fed to the antenna 1 which is provided with a parabolic reflector 2 in order to enhance directive transmission. The wave transmitted from antenna 1, the output of amplifier G, may then be, for example, a frequency modulated wave having a mean frequency of 1950 megacycles and a maximum frequency deviation of plus and minus 1.5 megacycles. Such wave will be a multichannel or a multiplexed wave, in accordance with the intelligence put on by multiplex equipment TT.

The receiving branch of the terminal station illustrated receives a signal from the next adjacent repeater station in the line; this signal is received by means of the same antenna 1 which is used for transmission (or by a separate antenna if desired). The next adjacent repeater station in the line may be arranged, for example, as described in the said copending application. The received wave, which may be a multiplexed frequency modulated wave having a mean frequency of 1990 megacycles, is fed by line 3 to a filter U which passes the frequency of 1990 megacycles. The filter U is sufficiently selective to prevent 1950-megacycle transmitter energy from entering the receiving branch. The output of filter U is passed on to mixer V, where it is combined with microwave energy from oscillator H to produce a low intermediate frequency of about 30 megacycles. This intermediate frequency energy is amplified in tuned intermediate frequency amplifier W, is limited in limiter X and is demodulated in discriminator Y, which is centered at 30 megacycles.

The demodulated signals from discriminator Y are passed to amplifier ZZ, where they are amplified. The amplified demodulated signals are then passed on to a deemphasis network Z, which reduces the amplitude of the higher frequency components by the same amount that they were emphasized in network A, and are then amplified in amplifier BB. The output of amplifier BB goes to multiplex equipment TT, for utilization of the signals transmitted from the opposite end of the relay system, or from repeater stations intermediate the two terminal stations.

The terminal station as described transmits multiplexed frequency modulated signals at a mean frequency in the vicinity of 2,000 megacycles and receives similar signals at another frequency separated 40 megacycles from the transmitted carrier frequency. In the example illustrated, the received frequency is 40 megacycles higher than the transmitted frequency (1990 megacycles as compared to 1950 megacycles). However, by properly choosing the frequency of oscillator H and by transmission of the proper sideband from the mixer F, it is possible to receive on a frequency 40 megacycles lower than the transmitted frequency (1950 megacycles as compared to 1990 megacycles). For example, oscillator H could have a frequency of 1920 megacycles and the upper sideband (1920 megacycles plus the 70 megacycles from amplifier E) could be transmitted from mixer F, for transmission on 1990 megacycles. Of course, in this case filter U would be designed to pass the 1950-megacycle received frequency, which would beat in mixer V with the 1920-megacycle frequency from oscillator H to give the desired 30-megacycle intermediate frequency for amplifier W.

Service channel and fault locating equipment SC is provided at the terminal station. Equipment SC is designed to cooperate with correlated equipment at the repeater stations of the relay system to provide means for communication incident to maintenance of operation between terminal and/or repeater stations, and also to provide terminal stations with indications of equipment failure or other abnormal conditions at the normally-unattended repeater stations. The telephone handset TH is provided at the terminal station for maintenance communication. For the transmission of voice (maintenance) communication from handset TH, the output connection 4 of equipment SC (to which handset TH is connected) goes to an input of amplifier AA, wherein voice signals coming out of said equipment are amplified, such signals then being applied to modulator B to frequency modulate oscillator C. In this manner, voice signals out of equipment SC are added to the multiplex signal being transmitted from the terminal station.

For reception of voice (maintenance) communication at the terminal station, as well as for the reception of fault indicating signals caused to be sent from the repeater stations in the manner described in the copending Thompson application, a part of the output of amplifier ZZ (derived from discriminator Y) is amplified in an amplifier YY and furnished to equipment SC.

The circuits B, C, D, E, V, W, X, Y, YY and ZZ constitute the receiver/modulator unit enclosed by dash-and-double-dot lines. These circuits, with two minor exceptions later detailed, together comprise the same basic receiver/modulator unit utilized in the repeater station described in the said copending application. Only the gated 110-megacycle oscillator and the relay of the receiver/modulator in the copending application, which are used at a repeater station to provide an outgoing transmitted carrier wave therefrom in the event of failure of an incoming wave to be received thereat for retransmission, are not required, as such, at a terminal station. These circuit elements as such are not necessary at a terminal station since at such station, of course, no incoming wave is received for retransmission therefrom, the incoming wave being demodulated at the terminal station for use thereat.

Undesired variations in the frequency of oscillator H, as well as variations in frequency of the received signal, cause frequency variations in the 30-megacycle I. F. signal appearing at the output of mixer V. It is necessary, for good operation of the system, to maintain the I. F. derived from mixer V at its proper value of 30 megacycles. Therefore, an AFC loop is provided to maintain the injection or heterodyne oscillator H at the proper frequency to obtain the desired 30-megacycle I. F. at the output of mixer V.

This frequency control loop comprises elements K and J. Discriminator Y is centered at 30 megacycles and provides a direct current output in line 5, of a polarity and magnitude depending upon the sense and amount of difference between the 30-megacycle center frequency and the frequency of the input to such discriminator. The direct current voltage in line 5 is amplified, and used to operate a relay, in the D. C. amplifier and relay unit K. An AFC motor J is controlled by the relay in unit K and mechanically controls the frequency of oscillator H, in the manner described in the copending application above referred to. In this way, the frequency of the local injection or heterodyne oscillator H is maintained at the proper frequency to provide the desired 30-megacycle I. F. at the output of mixer V.

The circuits E′, F, G, H, J and K constitute the transmitter unit enclosed by dot-dash lines. These circuits together comprise the same basic transmitter unit utilized in the repeater station described in the aforementioned copending application. For simplicity, the R. F. monitor and the relay of the transmitter unit, which are used at a repeater station (as described in said copending application) to effect transmission of a fault indicating signal when the transmitted R. F. output from the repeater station fails, are not illustrated in Fig. 1. At the terminal station, this monitor and relay are utilized to provide a fault indication. However, this particular indication will not be transmitted by the fault locating equipment, as is the case in a repeater station; at the terminal station, the relay contacts are utilized to light an indicating signal lamp directly. Also, such contacts may be utilized to initiate the transfer of connections to standby equipment, if such equipment is provided at the terminal station.

For further details of the circuits comprising the receiver/modulator unit and the transmitter unit, reference may be had to the aforementioned copending application. It may be seen that, since the basic transmitter and receiver/modulator units used at the terminal station are substantially the same as those used at a repeater station, the desired production economies may be effected; in general, any relay system will require a much larger number of repeater stations than terminals.

It will be noted that the microwave oscillator H, controlled in frequency by the motor J in the manner previously described, is utilized for heterodyning purposes in the mixer F of the transmitter, as well as in mixer V of the receiver. The frequency incoming to the terminal station, which has a nominal value of 1990 megacycles in the illustrated example, is of course the same as the frequency transmitted from the next adjacent repeater station. Occasionally, conditions may be such that this incoming frequency is not exactly 1990 megacycles. As a result, since oscillator H is so controlled (by the AFC loop previously described) as to maintain a 30-megacycle I. F. in the output of mixer V, under these conditions oscillator H may be changed to an output frequency different from its nominal (and normal) value of 2020 megacycles. Under these conditions, then, the changed frequency of oscillator H, when beaten in mixer F with the 70-megacycle output of amplifier E′, will result in a beat frequency which is different from the desired transmission frequency of 1950 megacycles. This is a situation which cannot be tolerated, because the transmitted frequency must be kept in the assigned channel at all times.

A terminal AFC unit, enclosed in dashed lines, consisting of circuits L, M, N, P, Q, S and T, is added at each terminal station to the basic transmitter and receiver/modulator units in order to accomplish the necessary frequency control function, the need for which is explained in the preceding paragraph. This function is accomplished with the addition of only this AFC unit at the terminal station.

A quartz crystal-controlled oscillator L, operating at 73 megacycles for example, serves as a reference or standard frequency source. The output of oscillator L is applied to a frequency tripler M, in the output of which appears the tripled-frequency of 219 megacycles. Tripler M has a tuned output circuit in which substantial harmonic content appears, including the ninth harmonic of the 219-megacycle frequency, which is 1971 megacycles. The output of tripler M is applied to a mixer N and it is this 1971-megacycle frequency, obtained from oscillator L and tripler M, which is effective as a reference frequency in such mixer. Utilization of the 1971-megacycle harmonic frequency is possible because the amount of R. F. power required by mixer N is very small, on the order of only a few milliwatts.

A portion of the output of amplifier G, normally at 1950 megacycles, is also supplied to mixer N. This portion of the output of transmitter amplifier G, which is utilized in the terminal AFC unit, is obtained by means of a coupling 15 extending directly from the output of such amplifier stage to mixer N, this coupling not being tied directly in parallel with the transmission line extending from amplifier G to the transmitting (and receiving) antenna 1. It should be realized that only a small portion of the output of amplifier G is used for AFC purposes, the remaining (larger) portion of the amplifier output being fed to antenna 1 for radiation to the next station in line in the radio relay system.

The mixer N provides a difference frequency of 21 megacycles, obtained by beating together the 1950-megacycle and the 1971-megacycle frequency from G and M, respectively, which difference frequency is amplified in I. F. amplifier P, tuned to 21 megacycles. It is desired to be pointed out that the eighth and tenth harmonics of 219 megacycles (the tripled-frequency in tripler M) result in intermediate frequencies far outside the passband of the intermediate frequency amplifier P. The eighth harmonic of 219 megacycles is 1752 megacycles, which gives an intermediate frequency of 198 megacycles when beaten with the 1950-megacycle frequency out of amplifier G. The tenth harmonic of 219 megacycles is 2190 megacycles, which gives an intermediate frequency of 240 megacycles when beaten with the 1950-megacycle frequency out of amplifier G. Both of these intermediate frequencies (198 megacycles and 240 megacycles) are greatly different from 21 megacycles.

The received 1990-megacycle signal does not interfere with the proper operation of the frequency control system, even though the same antenna 1 is used for transmission and reception. In addition to the fact that one input to the mixer N of the AFC unit is obtained through a coupling directly from the output of amplifier G, rather than through a coupling which is in parallel with the transmission line extending from amplifier G to antenna 1 (thus tending to eliminate any effect of the received 1990-megacycle frequency on the AFC unit), the received 1990-megacycle signal is at an extremely low level as compared with the 1950-megacycle signal derived from the output of amplifier G, which is used to operate the frequency control system. Both of these factors prevent any appreciable interference with the proper operation of the terminal AFC system by the received 1990-megacycle signal.

The output of amplifier P is applied to a discriminator Q which is centered at or tuned to 21 megacycles. This discriminator provides a direct current output of a polarity and magnitude depending upon the sense and amount of difference between the 21-megacycle center frequency and the frequency of the input to such discriminator. The direct current output voltage of discriminator Q is applied by means of a lead 19 to a reactance tube S which is coupled to oscillator T for controlling the frequency thereof.

In the above manner, oscillator T is maintained at a frequency such as to provide an intermediate frequency of 21 megacycles in mixer N at all times. Since the reference frequency of 1971 megacycles applied to mixer N is crystal-controlled and is therefore constant, this means that the output frequency of amplifier G (also applied to mixer N) is maintained at the proper 1950-megacycle value assigned for the operation of the relay system, or in other words, the 1950-megacycle transmitted frequency is controlled substantially to the assigned channel.

It will be remembered that the output of oscillator T beats with the output of oscillator C in mixer D to produce a beat frequency which is normally of 70 megacycles. Further on, the 70-megacycle output of amplifier E' beats with a portion of the output of oscillator H (the remaining portion of the output of oscillator H, it will be remembered, is supplied to mixer V in the receiver) in mixer F of the transmitter to produce the transmitted frequency which is normally 1950 megacycles.

Now suppose that, for some reason, the center frequency of the wave being received from the next adjacent repeater station shifts to a value different from the correct value of 1990 megacycles, for example to 1991 megacycles. This means that the frequency of the signal applied to discriminator Y will no longer be 30 megacycles, but instead will be 29 megacycles, the difference between 2020 megacycles and 1991 megacycles. Then, a D. C. voltage will appear in line 5 and frequency controlling action of oscillator H by motor J will take place to shift the frequency of said oscillator to a different value exactly 30 megacycles away from the incoming 1991-megacycle frequency; the oscillator H would in this example be shifted to 2021 megacycles.

The 2021-megacycle frequency of oscillator H, beating in mixer F with the 70-megacycle output of amplifier E, would produce a difference frequency of 1951 megacycles for transmission from the terminal station, rather than the desired frequency of 1950 megacycles; this means that the frequency transmitted from the terminal station would be out of the assigned channel, a condition which cannot be tolerated. However, the 1951-megacycle transmitted frequency would be applied to mixer N, there to beat with the 1971-megacycle reference frequency, producing a difference frequency of 20 megacycles which is applied to discriminator Q. Since the frequency applied to discriminator Q is no longer 21 megacyces, a D. C. voltage will be produced by such discriminator and frequency controlling action of oscillator T by reactance tube S will take place to shift the frequency of said oscillator to a different value such as to provide an I. F. closer to 21 megacycles to discriminator Q, at which time the output frequency of amplifier G will be shifted closer to 1950 megacycles. As is well known in the art, the amount of correction will depend on the effective gain around the AFC control loop. Assuming a correction factor of 10, the frequency of oscillator T will be shifted by the action of reactance tube S to a new frequency of 110.9 megacycles. This 110.9-megacycle frequency will beat in mixer D with the 40-megacycle output of oscillator C to produce a difference frequency of 70.9 megacycles which, applied through amplifier E' to mixer F to there beat with the 2021-megacycle output of oscillator H, will produce a difference or beat frequency for amplifier G of 1950.1 megacycles. Thus, the frequency transmitted from the terminal station is effectively controlled. This 1950.1-megacycle signal, of course, beating in mixer N with the 1971-megacycle reference frequency from tripler M, provides a 20.9-megacycle I. F. to discriminator Q, maintaining a control voltage to hold oscillator T at 110.9 megacycles.

The frequency controlling action described will take place whenever the output frequency of amplifier G is not exactly at 1950 megacycles. In addition to the cause stated for the error in output frequency of this amplifier (to wit, the frequency controlling action of oscillator H which has taken place), an error in the output frequency of amplifier G could result from other effects, such as frequency drift of oscillator C. Such frequency drift is also counteracted by the frequency controlling action described.

In the manner described, the frequency transmitted by the repeater station of this invention is maintained substantially in the assigned channel. Moreover, this is accomplished even though the receiver-controlled local heterodyne oscillator H does not have its nominal frequency of 2020 megacycles because of the operation of the receiver-controlled AFC system including motor J, and even though the frequency-modulated oscillator C does not have its nominal frequency of 40 megacycles.

Figure 2:
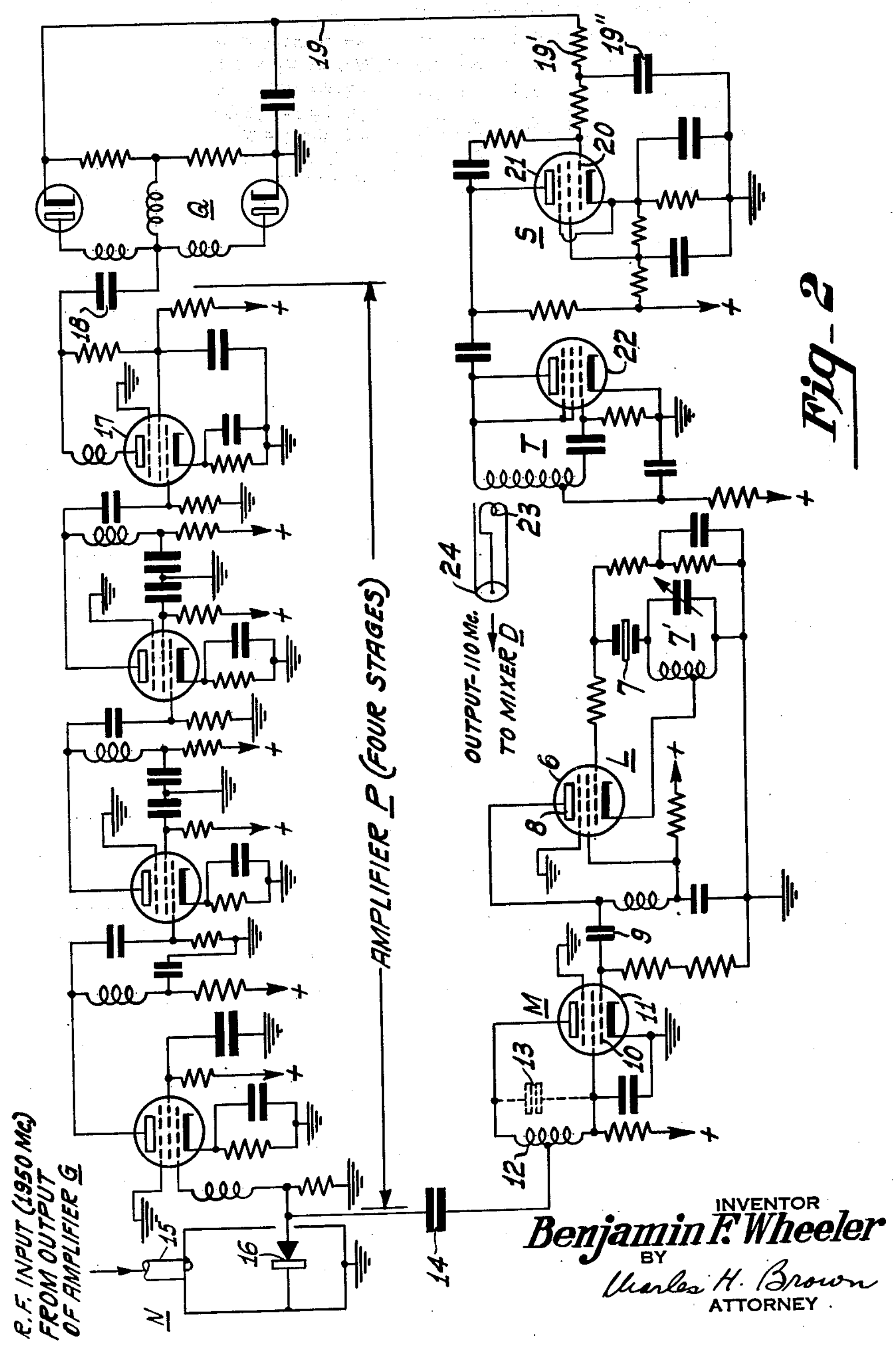
Fig. 2 is a detailed circuit diagram of the terminal AFC unit of Fig. 1.

Fig. 2 is a detailed circuit diagram of the terminal AFC unit of this invention. The crystal oscillator L comprises a vacuum tube 6 connected in a crystal oscillator circuit well known in the art, with the quartz crystal 7 being connected between the control grid and resonant circuit 7', which is coupled to the cathode of such tube. This oscillator operates, in the example given, at a frequency of 73 megacycles. The anode 8 of oscillator tube 6 is connected through a coupling condenser 9 to the control grid 10 of a vacuum tube 11 connected to act as a frequency tripler M. In this way, the 73-megacycle output of oscillator L is supplied to frequency tripler M.

The tuned output circuit of tripler M includes an inductance 12 which is resonant with the output capacitance 13 of tube 11 at a frequency of 219 megacycles. In this tuned circuit there appears the tripled-frequency of 219 megacycles, as well as several harmonics of such tripled frequency, including the ninth, having a frequency of 1971 megacycles. It is this ninth harmonic, 1971 megacycles, which serves as the reference or standard frequency for the terminal AFC arrangement disclosed. This 1971-megacycle frequency is coupled through a coupling capacitor 14 to mixer N. Said mixer is also supplied with oscillatory energy of a frequency of 1950 megacycles from the output of R. F. amplifier G in the transmitter unit, by means of a coaxial line 15. Mixer N is a crystal-type mixer the intermediate frequency output from which (the difference between the reference frequency from tripler M and the transmitter frequency from amplifier G) is taken from the crystal 16 and supplied to the I. F. amplifier P through a suitable coupling arrangement including an inductance. The non-linear current-voltage characteristic of crystal 16 also serves to augment the harmonics of 219 megacycles.

The amplifier P may be a four-stage vacuum tube tuned intermediate frequency amplifier operating, for example, at 21 megacycles (the difference between the harmonic reference frequency of 1971 megacycles and the transmitter frequency of 1950 megacycles). The input and interstage couplings of this amplifier are as indicated in Fig. 2. Output from the final stage 17 of amplifier P is fed via a coupling condenser 18 to a discriminator Q of modified Conrad type, including a pair of rectifiers, operating at a center frequency of 21 megacycles. The D. C. voltage output from this discriminator (the relative polarity and magnitude of which are dependent upon the difference between the 21-megacycle center frequency and the frequency of this signal fed to such discriminator) is taken off via a lead 19 for AFC purposes.

Lead 19 feeds the D. C. output voltage of discriminator Q to the control grid 20 of a vacuum tube 21 constituting the reactance tube S. Tube 21 is coupled to the tube 22, connected in an oscillatory circuit operating at 110 megacycles and constituting the oscillator T. Tube 21 is connected to act as a reactance tube S for oscillator T, whereby the frequency of such oscillator may be controlled in response to the D. C. control voltage applied to grid 20 of tube 21. Thus, the frequency of oscillator T is controlled by the D. C. output voltage of discriminator Q. Resistance-capacitance network 19', 19'' serves to eliminiate any demodulated signals appearing at the output of discriminator Q and also provides a suitable time delay in the frequency control loop.

A 110-megacycle output signal is taken from oscillator T and fed to the mixer D in the receiver/modulator unit, by means of a loop 23 inductively coupled to the tank circuit of oscillator T and connected to a coaxial line 24 extending to said mixer.

Figure 3:
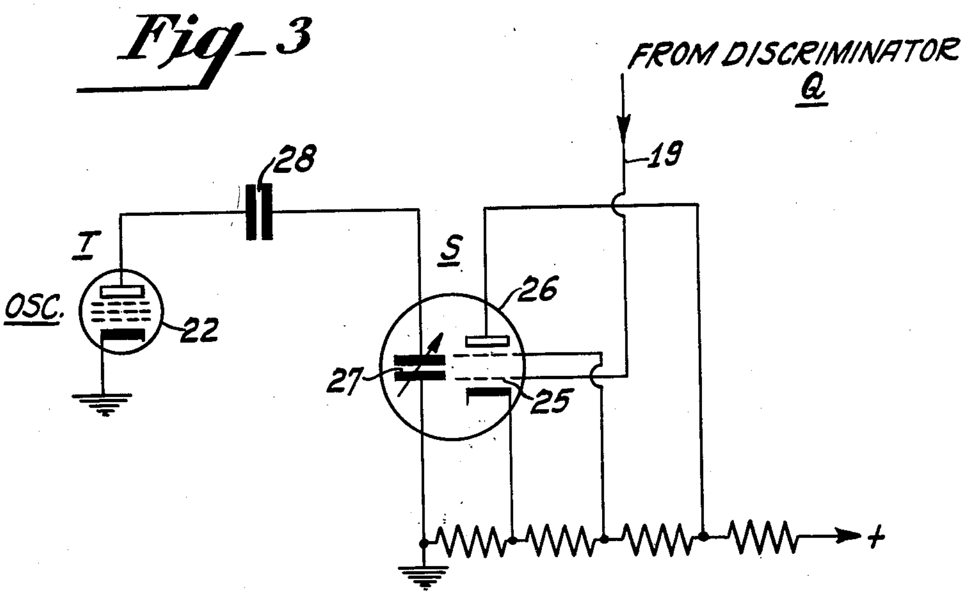
Fig. 3 is a partial circuit diagram of a modification of Fig. 2.

Although a reactance tube arrangement for controlling the frequency of oscillator T is illustrated in Fig. 2, this has been done only by way of example. Any of several means, well-known in the art, for frequency control of an oscillator in response to a direct current potential, would be suitable. Another possible arrangement for controlling the frequency of oscillator T in response to the output of discriminator Q is illustrated in Fig. 3. In order to simplify the description, Fig. 3 illustrates only that portion of Fig. 2 which is modified according to the instant concept. It is to be understood that, for the purpose of the terminal station of this invention, either the reactance tube arrangement of Fig. 2 or the variable capacitance electron discharge device of Fig. 3, now to be described, would be satisfactory, or also other means such as the motor control used for oscillator H.

In Fig. 3, the output lead 19 of discriminator Q goes to the control grid 25 of a special variable capacitance tube or variable capacitance electron discharge device 26, for example a Sylvania type SR1041A, constituting the reactance tube S. Tube 26 consists, in general, of a plurality of electrodes supplied with operating potentials as illustrated, a variable capacitor 27 being provided in such tube, this capacitor being varied in response to variations in the voltage applied to control grid 25 through the heating action of plate current flowing in the variable capacitance tube. Since the voltage applied to grid 25 is the D. C. output of discriminator Q, the value of capacitor 27 depends upon the output of discriminator Q. The variable capacitor 27 of tube 26 is coupled to oscillator tube 22 through a coupling condenser 28, in such a way that said capacitor controls the frequency of oscillator T. Thus, the frequency of the 110-megacycle oscillator T is controlled by the D. C. output voltage of discriminator Q.

Instead of the reactance-type frequency modulator B and the frequency-modulated oscillator C, other arrangements could be used to provide a source of signal-modulated energy for transmission, such sources supplying signal-modulated energy to mixer D for eventual transmission from the terminal station illustrated.

Figure 4:
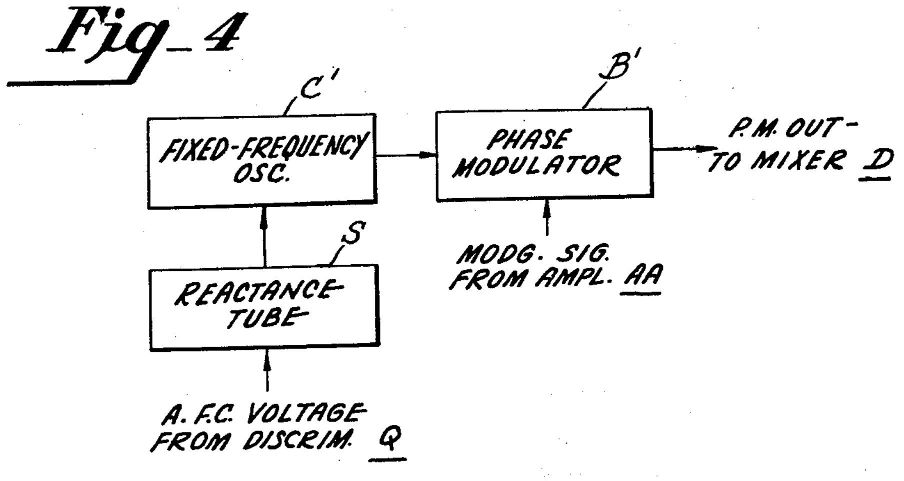
Fig. 4 is a partial block diagram of a modification of Fig. 1.

For example, as illustrated in Fig. 4, units B and C could be replaced by a fixed frequency oscillator C′ followed by a phase modulator B′ to which the output of amplifier AA is supplied as a modulating signal. In this case, of course, the phase modulated output of the phase modulator B′ would be fed to mixer D for eventual transmission. The phase modulated output signal of modulator B′, of course, may be converted to an equivalent frequency modulated signal in any well-known manner, such as by utilizing an appropriate correction network in the modulating signal input connections to modulator B′. If the aforesaid arrangement of fixed-frequency oscillator and a following phase modulator were utilized as the source of signal-modulated energy for the transmitter, there would be good reason for utilizing the terminal AFC unit (including elements L, M, N, P, Q and S) to control the frequency of the fixed-frequency oscillator C′ as shown in Fig. 4, rather than the frequency of the 110-megacycle oscillator T, as illustrated in Fig. 1. It is within the scope of this invention to employ the terminal AFC unit for the control of the oscillator (either C in Fig. 1 or C′ in Fig. 4) in the source of signal-modulated energy. By doing this, similar results can be achieved, insofar as stabilization of the transmitted frequency is concerned, since the outputs of the oscillator T and of the source of signal-modulated energy are mixed in mixer D to produce the 70-megacycle frequency and it is this 70-megacycle frequency which must be controlled to stabilize the transmitted frequency.

What I claim to be my invention is as follows:

1. In a local station for a radio relay system including a remote station arranged for communication with said local station, means for radiating a wave to said remote station and for receiving a wave radiated therefrom, a source of heterodyning energy, means for heterodyning the received wave with energy from said source to produce a wave of another frequency, means for controlling the frequency of said source to maintain said other frequency at a predetermined value irrespective of variations in the frequency of the received wave, a signal modulated energy source, a heterodyne oscillator, means for mixing the outputs of said last-named source and of said oscillator to produce a beat frequency wave, means for heterodyning said beat frequency wave with energy from said source of heterodyning energy to produce an output wave of predetermined frequency, means for coupling said last-named wave to said radiating means, and means responsive to the frequency of said last-named wave for automatically controlling the frequency of one of the two outputs mixed in said mixing means to maintain said output wave of predetermined frequency substantially at a constant value irrespective of variations in the frequency of said source of heterodyning energy.

2. In a local station for a radio relay system including a remote station arranged for communication with said local station, means for radiating a wave to said remote station and for receiving a wave radiated therefrom, a source of heterodyning energy, means for heterodyning the received wave with energy from said source to produce a wave of another frequency, means responsive to the frequency of said last-named wave for automatically controlling the frequency of said source to maintain said other frequency at a predetermined value irrespective of variations in the frequency of the received wave, a signal modulated energy source, a heterodyne oscillator, means for mixing the outputs of said last-named source and of said oscillator to produce a beat frequency wave, means for heterodyning said beat frequency wave with energy from said source of heterodyning energy to produce an output wave of predetermined frequency, means for coupling said last-named wave to said radiating means, and means for controlling the frequency of said heterodyne oscillator to maintain said output wave of predetermined frequency substantially at a constant value irrespective of variations in the frequency of said source of heterodyning energy produced by the action of the first-named controlling means.

3. In a local station for a radio relay system including a remote station arranged for communication with said local station, means for radiating a wave to said remote station and for receiving a wave radiated therefrom, a source of heterodyning energy, means for heterodyning the received wave with energy from said source to produce a wave of another frequency, means responsive to the frequency of said last-named wave for controlling the frequency of said source to maintain said other frequency at a predetermined value irrespective of variations in the frequency of the received wave, a signal modulated energy source, a heterodyne oscillator, means for mixing the outputs of said last-named source and of said oscillator to produce a beat frequency wave, means for heterodyning said beat frequency wave with energy from said source of heterodyning energy to produce an output wave of predetermined frequency, means responsive to the frequency of said last-named wave for controlling the frequency of one of the two outputs mixed in said mixing means to maintain said output wave of predetermined frequency substantially at a constant value irrespective of variations in the frequency of said source of heterodyning energy produced by the action of the first-named controlling means, and means for coupling said output wave of predetermined frequency to said radiating means.

4. An arrangement in accordance with claim 3, wherein the one of said two outputs which is controlled in frequency is that of the heterodyne oscillator.

5. An arrangement in accordance with claim 3, wherein the one of said two outputs which is controlled in frequency is that of the signal modulated energy source.

6. An arrangement in accordance with claim 3, wherein the last-mentioned frequency controlling means includes means for comparing the output wave of predetermined frequency with a fixed reference frequency wave and for producing a voltage in response to frequency differences between the two waves being compared, and means for utilizing said voltage to control the frequency of that one of said two outputs which is controlled in frequency.

7. An arrangement in accordance with claim 3, wherein the first-mentioned frequency controlling means includes means for producing a voltage in response to variations in the frequency of said other frequency wave from a predetermined value, and means for utilizing said voltage to control the frequency of said source of heterodyning energy.

8. An arrangement in accordance with claim 3, wherein the last-mentioned frequency controlling means includes means for comparing the output wave of predetermined frequency with a fixed reference frequency wave and for producing a voltage in response to frequency differences between the two waves being compared, and means for utilizing said voltage to control the frequency of that one of said two outputs which is controlled in frequency, and wherein the first-mentioned frequency controlling means includes means for producing a voltage in response to variations in the frequency of said other frequency wave from a predetermined value, and means for utilizing said last-mentioned voltage to control the frequency of said source of heterodyning energy.

9. An arrangement in accordance with claim 6, wherein the one of said two outputs which is controlled in frequency is that of the heterodyne oscillator.

10. An arrangement in accordance with claim 6, wherein the one of said two outputs which is controlled in frequency is that of the signal modulated energy source.

11. An arrangement in accordance with claim 8, wherein the one of said two outputs which is controlled in frequency is that of the heterodyne oscillator.

12. An arrangement in accordance with claim 8, wherein the one of said two outputs which is controlled in frequency is that of the signal modulated energy source.

13. In a terminal station for a frequency modulation radio relay system including a remote station arranged for communication with said terminal station, means for radiating a frequency modulated wave to said remote station and for receiving a frequency modulated wave radiated therefrom, a source of heterodyning energy, means for heterodyning the received frequency modulated wave with energy from said source to produce a frequency modulated wave of another mean frequency, means for controlling the frequency of said source to maintain said other mean frequency at a predetermined value, an oscillator frequency modulated by intelligence to be transmitted from said terminal station, a heterodyne oscillator, means for mixing the outputs of said two oscillators to produce a frequency modulated beat frequency wave, means for heterodyning said beat frequency wave with energy from said source to produce a frequency modulated output wave of predetermined mean frequency, means for coupling said last-named wave to said radiating means, and means for controlling the frequency of one of said oscillators to maintain said output wave of predetermined frequency substantially at a constant value.

14. An arrangement in accordance with claim 13, wherein said one oscillator is the heterodyne oscillator.

15. An arrangement in accordance with claim 13, wherein said one oscillator is the frequency modulated oscillator.

16. An arrangement in accordance with claim 13, wherein the last-mentioned frequency controlling means includes means for comparing the output wave of predetermined mean frequency with a fixed reference frequency wave and for producing a voltage in response to frequency differences between the two waves being compared, and means for utilizing said voltage to control the frequency of said one oscillator.

17. An arrangement in accordance with claim 13, wherein the first-mentioned frequency controlling means includes means for producing a voltage in response to variations in the mean frequency of said other frequency wave from a predetermined value, and means for utilizing said voltage to control the frequency of said source, and wherein the last-mentioned frequency controlling means includes means for comparing the output wave of predetermined mean frequency with a fixed reference frequency wave and for producing a voltage in response to frequency differences between the two waves being compared, and means for utilizing said last-mentioned voltage to control the frequency of said one oscillator.

18. An arrangement in accordance with claim 17, wherein said one oscillator whose frequency is controlled is the heterodyne oscillator.

19. In a terminal station for a frequency modulation radio relay system including a remote station arranged for communication with said terminal station, means for radiating a frequency modulated wave to said remote station and for receiving a frequency modulated wave radiated therefrom, a source of heterodyning energy, means for heterodyning the received frequency modulated wave with energy from said source to produce a frequency modulated wave of another mean frequency, means for controlling the frequency of said source to maintain said other mean frequency at a predetermined value irrespective of variations in the mean frequency of the received wave, an oscillator, means for frequency modulating said oscillator by intelligence to be transmitted from said terminal station, a heterodyne oscillator, means for mixing the outputs of said two oscillators to produce a frequency modulated beat frequency wave, means for heterodyning said beat frequency wave with energy from said source to produce a frequency modulated output wave of predetermined mean frequency, means for coupling said last-named wave to said radiating means, and means for controlling the frequency of said heterodyne oscillator to maintain said output wave of predetermined mean frequency substantially at a constant value irrespective of variations in the frequency of said source produced by the action of the first-named controlling means and irrespective of variations in the mean frequency of said first-mentioned oscillator.

BENJAMIN F. WHEELER.

References Cited in the file of this patent

UNITED STATES PATENTS

| Number | Name | Date |
|---|---|---|
| 2,284,706 | Wiessner et al. | June 2, 1942 |
| 2,333,719 | Herold | Nov. 9, 1943 |
| 2,408,826 | Vogel | Oct. 8, 1946 |
| 2,460,781 | Cantelo | Feb. 1, 1949 |
| 2,519,369 | Hansen et al. | Aug. 22, 1950 |
| 2,614,211 | Goodall | Oct. 14, 1952 |